United States Patent [19]

Holt et al.

[11] 4,051,869

[45] Oct. 4, 1977

[54] MIXING VALVE

[75] Inventors: James W. Holt, Brookland; John K. Meeks, Jonesboro, both of Ark.

[73] Assignee: Crane Co., New York, N.Y.

[21] Appl. No.: 648,078

[22] Filed: Jan. 12, 1976

[51] Int. Cl.² ............................................. F16K 11/14
[52] U.S. Cl. ................................ 137/636.1; 137/607; 251/257
[58] Field of Search .................... 137/607, 636–636.3

[56] References Cited

U.S. PATENT DOCUMENTS

| 1,095,003 | 4/1914 | Leonard | 137/636.1 |
|---|---|---|---|
| 2,898,938 | 8/1959 | Dombre | 137/607 X |
| 3,420,272 | 1/1969 | Corlett | 137/636.3 |
| 3,526,250 | 9/1970 | Miller | 137/636.3 X |
| 3,812,875 | 5/1974 | Buhler | 137/636.1 X |

Primary Examiner—Martin P. Schwadron
Assistant Examiner—Richard Gerard
Attorney, Agent, or Firm—Edward H. Mazer; George S. Schwind

[57] ABSTRACT

A liquid mixing valve of the single handle type for mixing hot and cold water which incorporates a pair of plungers which are positioned in variable depth cams formed in a slider plate whereby actuation of the plate via a handle displaces the respective plungers from their seated position to permit passage of fluid therethrough.

16 Claims, 13 Drawing Figures

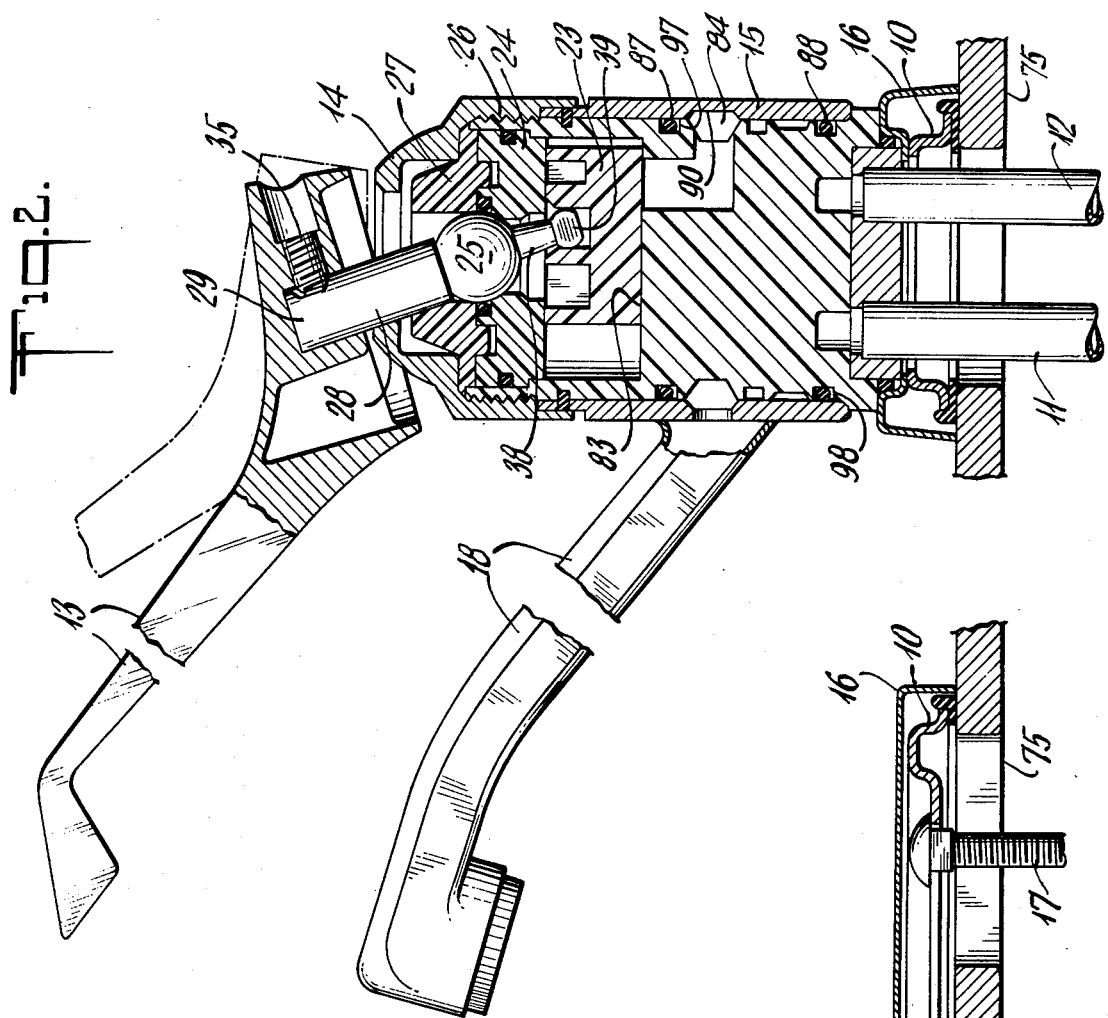
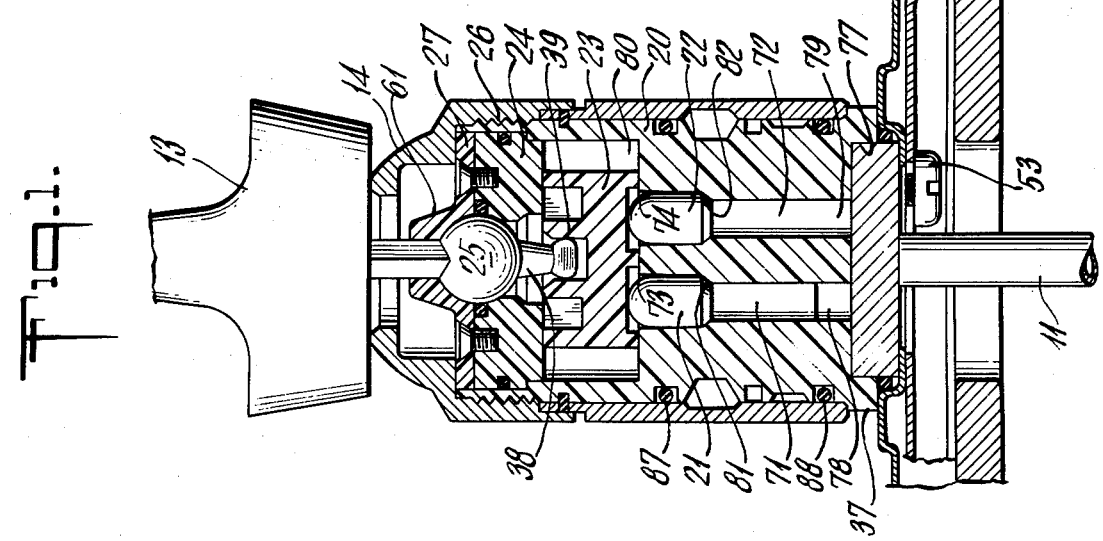

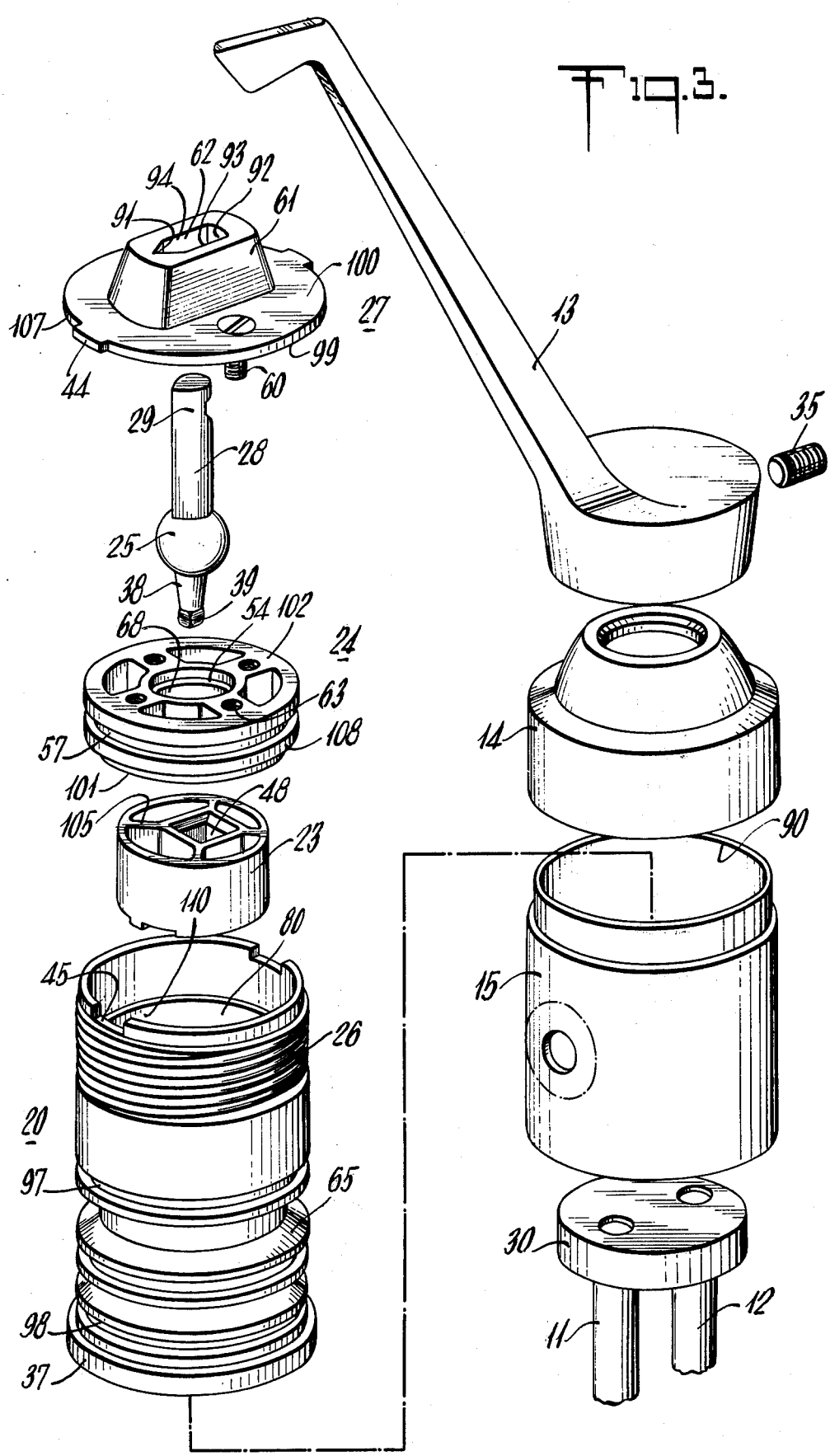

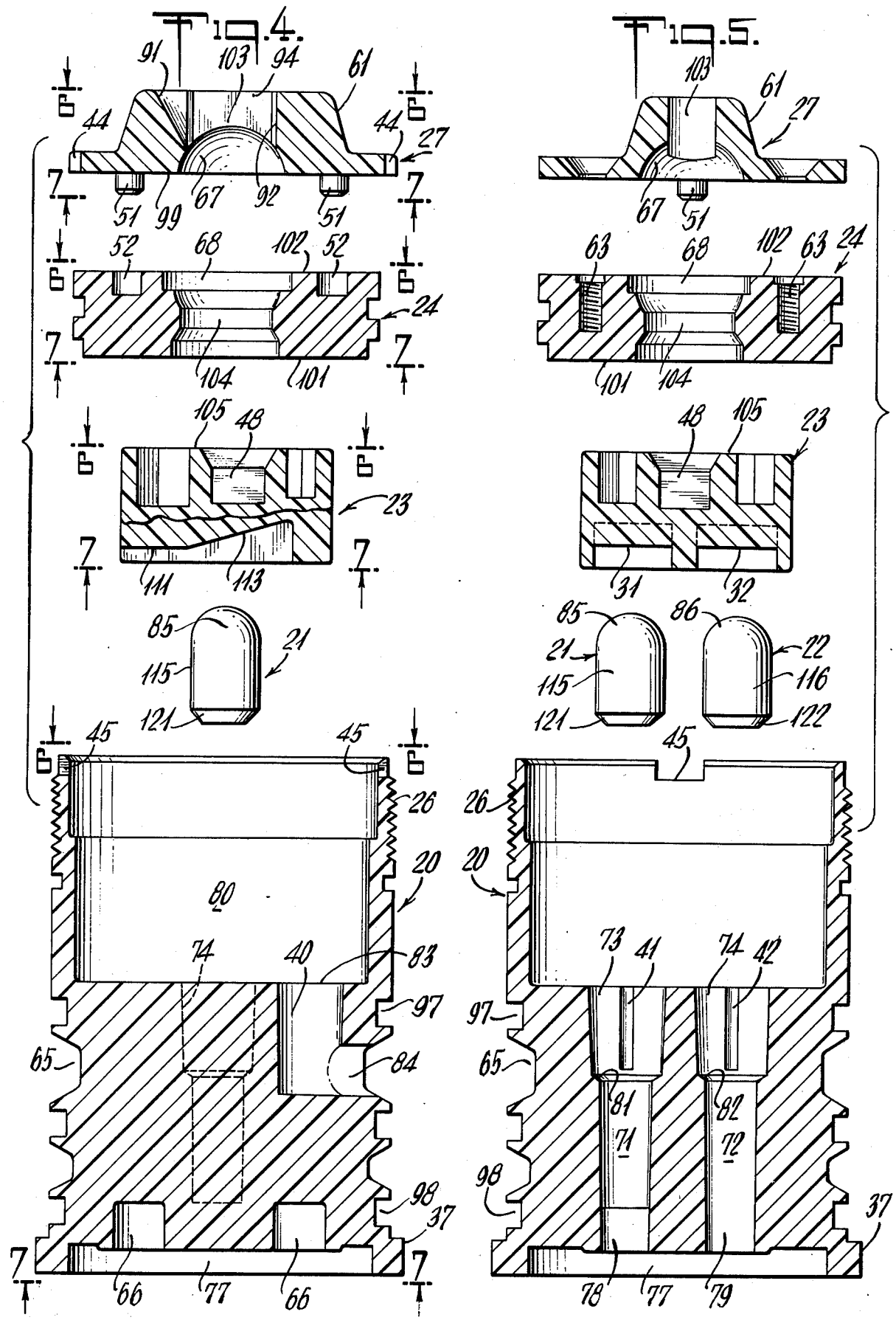

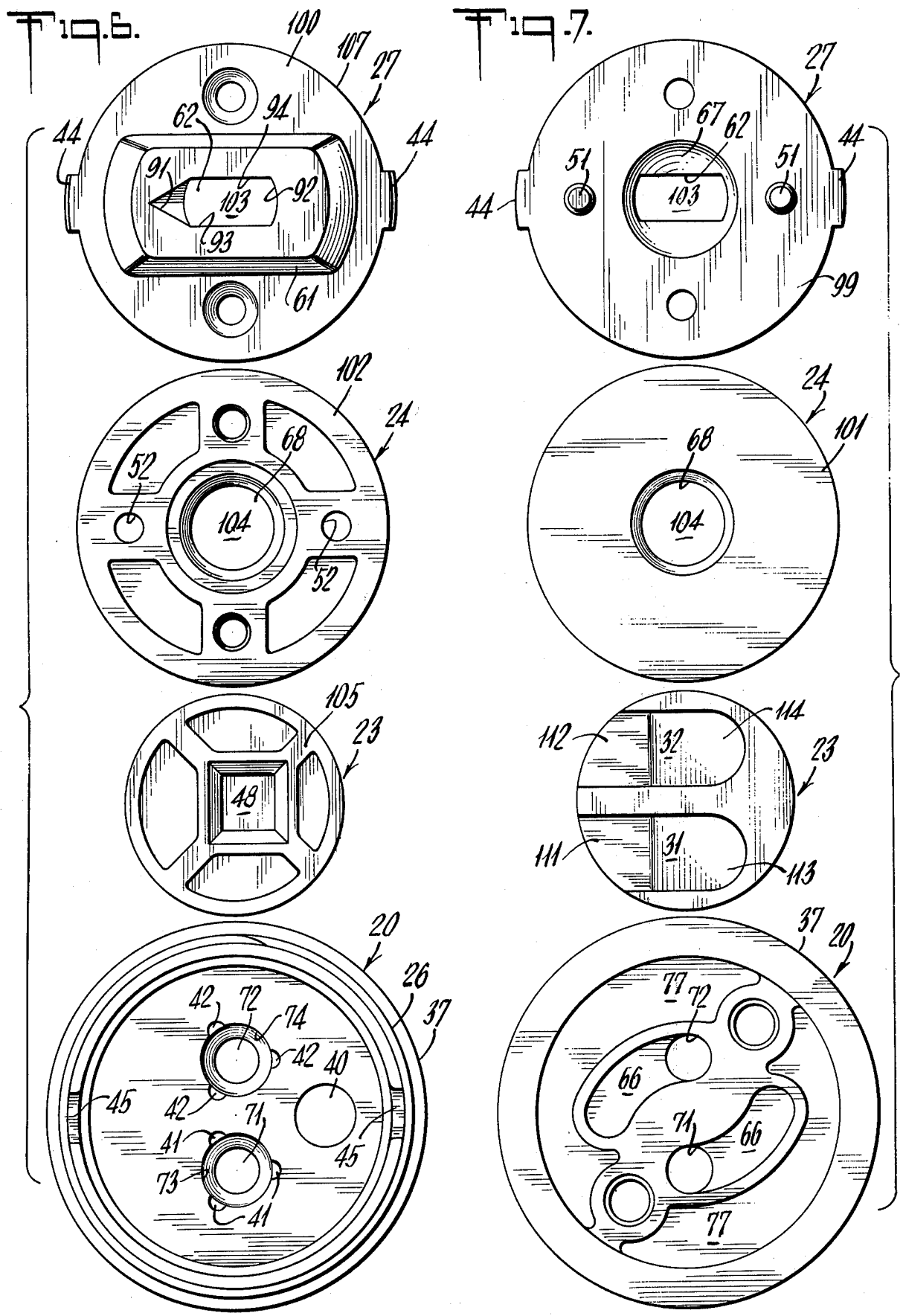

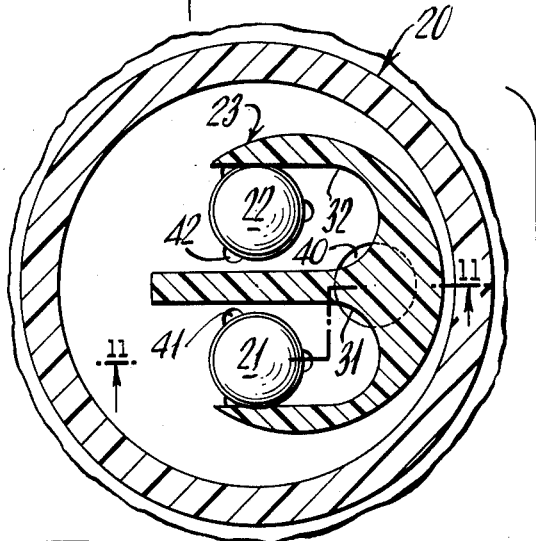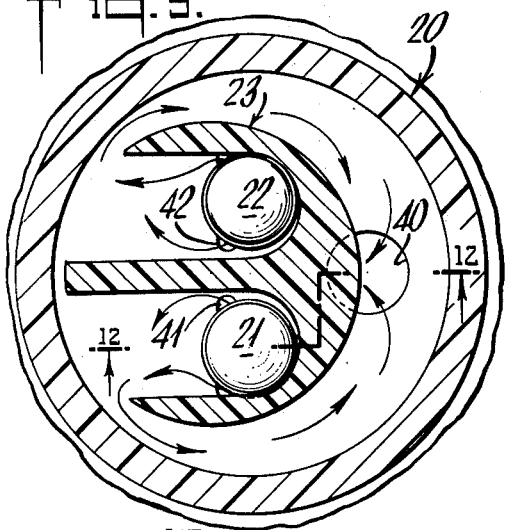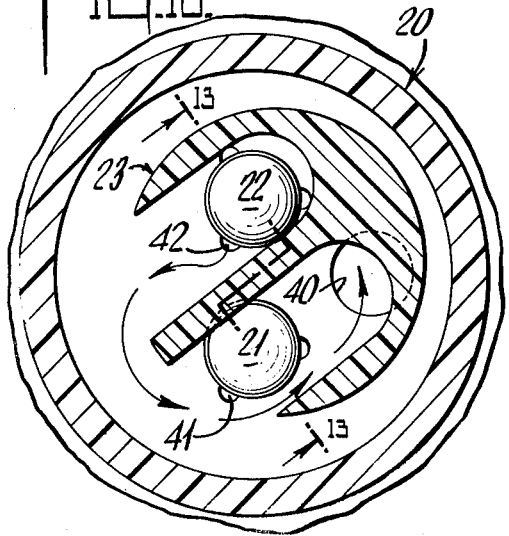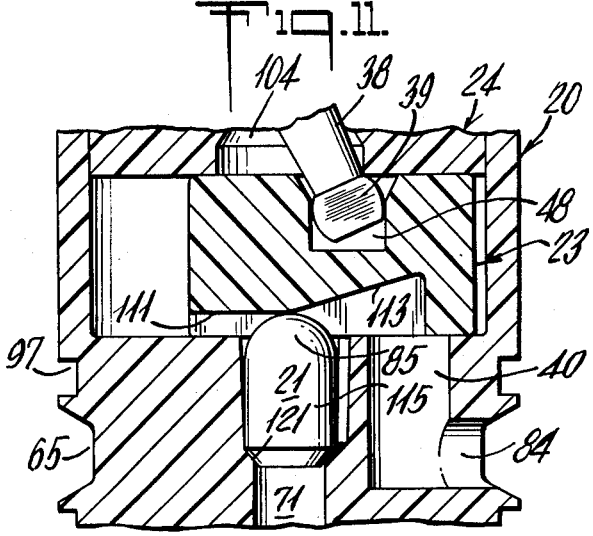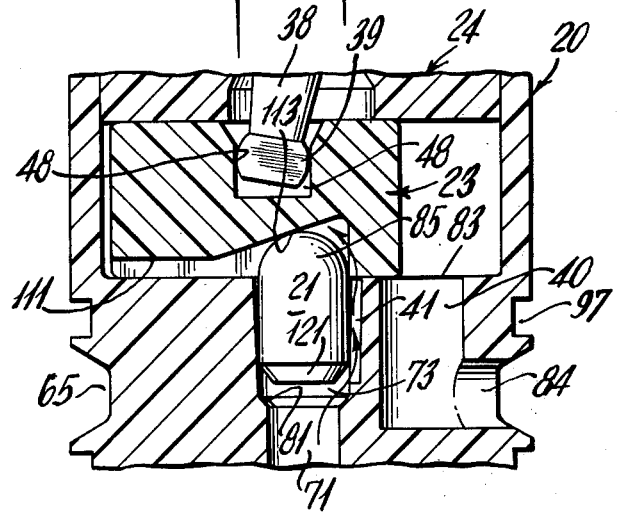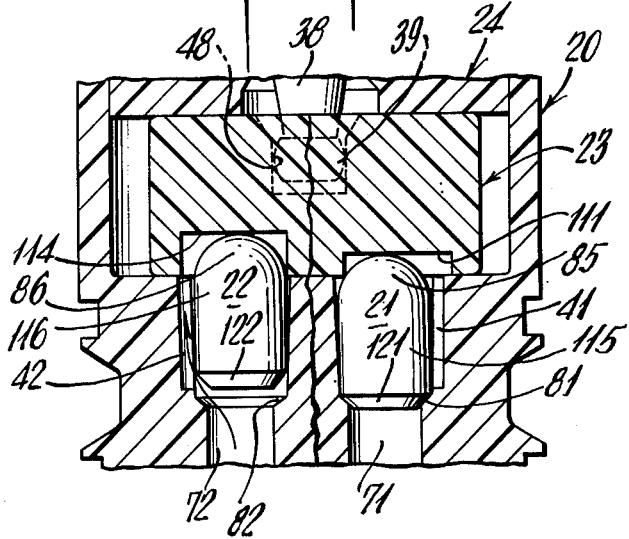

MIXING VALVE

BACKGROUND AND SUMMARY OF THE INVENTION

This application relates to a single handle valve for regulation of the flow rate and temperature of the water delivered. More particularly, this invention relates to an improved, single-handle, reliable, easily repaired single lever volume and proportion control valve for combined hot and cold water faucets on fixtures such as kitchen sinks and bathroom lavatories.

Previously, many types of single handle mixing valves have been developed utilizing sliding plates, tilting poppets and various other closure means. These valves have several undesirable features. Replacement of sealing means, such as washers, is usually required after a period of use. At other times, a component in the valve mechanism may fail due to wear, misalignment, or clogging with foreign matter. This normally requires the time-consuming piece by piece disassembly and subsequent reassembly of the entire valve mechanism. Moreover, the replacement parts or the aforesaid valves are usually relatively expensive since many of the wear items are normally ceramic, machined steel or rubber coated metal. In addition, misalignment may occur during reassembly of the valve resulting once again in malfunctioning or premature failure of the valve.

The basic objective of the invention is to provide an improved single handle mixing valve having a removable and readily replaceable valve assembly comprising, in part, a pair of plungers and a slider plate having a pair of cam surfaces for constraining the upward movement of the plungers.

Another objective of the invention is to provide a mixing valve structure havig a single handle wherein reciprocation will control the volume of liquid dispensed and rotation will control the temperature of the dispensed liquid.

It is another object to provide a valve in which all wear items are relatively inexpensive and readily replaceable.

It is still a further object to provide a valve which is mechanically reliable and not prone to leak.

With these and various other objects in view, the invention consists of certain novel features of construction and operation, as will be more fully described and particularly pointed out in the specification, drawings and claims appended hereto.

In the drawings, wherein the preferred embodiment of the device is shown,

FIG. 1 is a sectional view taken longitudinally through the valve showing the plungers, slider plate and actuator;

FIG. 2 is a rear sectional view taken longitudinally through the valve 90° from FIG. 1;

FIG. 3 is an exploded assembly drawing showing the components of the valve assembly;

FIG. 4 is a side sectional assembly drawing showing the plunger and ball sub-assembly with the ball omitted for clarity;

FIG. 5 is a rear sectional assembly drawing showing the plunger and ball sub-assembly with the ball omitted for clarity;

FIG. 6 is a plan view of the plunger with ball sub-assembly components of FIG. 4 taken along line 6—6;

FIG. 7 is a plan view of the plunger and ball sub-assembly components of FIG. 4 taken along line 7—7;

FIG. 8 is a sectional view showing the positions of the plungers and slider plate when the valve is closed to fluid flow.

FIG. 9 is a sectional view showing the positions of the plungers and slider plate when the valve handle has been raised for full fluid flow.

FIG. 10 is a sectional view showing the position of the plungers and slider plate when the handle has been positioned for full-flow of cold water and no flow of hot water through the valve.

FIG. 11 is a fragmentary sectional view along line 11—11 in FIG. 8 showing the position of the plungers and slider plate when there is no flow through the valve.

FIG. 12 is a fragmentary sectional view along line 12—12 in FIG. 9 showing the position of the slider plate cams and plungers when both the hot water and cold water sections of the valve are full open.

FIG. 13 is a fragmentary sectional view taken along line 13—13 in FIG. 10 showing the slider plate cams and plungers when the cold water portion of the valve is completely closed.

With reference to the drawings and in particular FIGS. 1, 2 and 3, the valve structure disclosed has been primarily designed as equipment for a sink or the like. The valve base 10 is adapted to be secured as by bolts 17 on a top wall portion 75 of a sink (not shown) and in enclosing relation with the hot and cold water inlet ports 11 and 12. A base cover or escutcheon 16 may be installed over base plate 10 to provide a more attractive unit. Inlet ports 11, 12 are integral with inlet port holder 30 which is in sealing relationship with valve cartridge 20. The inlet port holder 30, valve base 10, base plate 16 and valve cartridge 20 are fixedly attached to the top wall portion 75 of the sink by screws 53. A compressible gasket (not shown) is preferably located between the inlet port holder 30 and the valve cartridge 20 to assure a water tight seal between said inlet port holder and base 37.

The valve cartridge 20 is formed of plastic or other suitable material and has a recess 77 in the base 37 into which the inlet port holder 30 is received. The upper portion of said valve cartridge contains a recess 80 into which the valve assembly hereinafter described is located. Communicating between the inlet port holder 30 and the valve assembly are a pair of water inlet passages 71, 72 each of which is substantially cylindrical with a slight outward and upward taper. The outlet section 73, 74 of passages 71, 72 are preferably larger in diameter than the inlet sections 78, 79, respectively. The transition between the larger and smaller diameters sections is accomplished by short upwardly and outwardly extending tapered seats 81, 82. The upper portion of each of said passages is fluted 41, 42 at the upper extremeties around the periphery of each water passage, as shown in FIG. 5.

A water discharge passage 40 is preferably located equidistant between the water inlet passages 71 and 72. This discharge passage communicates between the terminus plate 83 of the water inlet passages 71, 72 and a lower point 84, on said valve cartridge periphery 65.

The valve cartridge 20 is located and restrained within a housing comprising the inlet port holder 30, a retaining top 14 and a valve cover plate 15, the valve cover plate having inside dimensions slightly larger than the outer dimensions of said valve cartridge. A flow channel is formed by the aforementioned valve housing peripheral recess 65 and inner surface 90 of the valve cover plate 15. "O" rings 87, 88 may be inserted into valve cartridge peripheral recesses 97, 98 respectively located above and below peripheral recess area 65 to insure an hydraulic seal between the valve cartridge 20 and the valve cover plate 15.

The upper portion of the valve cartridge has external threads 26 by which a locking means, such as retaining top 14 may be affixed to the valve cartridge 20 to secure the valve cover plate 15 and all of the other valve components herein described. In the perferred embodiment the valve cartridge 20 is substantially cylindrical as shown. The valve cover plate 15 similarly is of a generally cylindrical shape thereby permitting rotation of the cover plate 15 and the spout 18 around the valve body. In a kitchen sink installation this rotation of the valve housing cover plate 15 and spout 18 attached thereto is especially useful for filling multiple sections of the sink or for moving said spout away from the sink when unobstructed access to the sink is desired.

With reference to FIG. 5, a pair of plungers 21, 22 are located in the outlet sections 73, 74, of water passages 71, 72, respectively. Said plungers preferably have substantially cylindrical central sections 115, 116 with the lower end of each plunger being inwardly tapered around its periphery to provide for watertight seating faces 121, 122 when the plungers contact the outwardly complementary tapered seats 81, 82 of water inlet passages 71, 72. The flow rate of water through water passages 71, 72 is controlled by the distance between the seating faces 121, 122 and the complementary tapered seats 81, 82, respectively. Top portions 85, 86 of plungers 21, 22 are preferably hemispherical forming cam followers. The diameters of plungers 21, 22 must be slightly less than the diameters of the water inlet passages 71, 72 so that the plungers are freely slideable therein.

Slider plate 23 is located in the valve cartridge 20 immediately above the terminus plane 83 of the inlet water passages 71, 72. Located above said slider plate are a lower ball guide 24 and an upper ball guide 27, said guide 24 positioned below said guide 27. The lower face 99 of said upper ball guide and the upper face 102 of said lower ball guide each have hemispherical recesses therein 67, 68, respectively, complementary to that of a spheroidal means comprising spherical ball 25. The upper ball guide 27 and the lower ball guide 24 have passages 103, 104 through the center of said hemispherical recesses 67, 68, respectively, for passage of the upper ball stem 28 and the lower ball stem 38, respectively, which preferably are fixedly attached to diametrically opposite sides of the ball and in linear alignment with each other.

With reference to FIG. 3, the uppermost section 29 of the upper ball stem is so shaped that it can be secured to the base 96 of valve handle 13 by recessed screw 35. The terminus 39 of the stem 38 is so shaped that it contacts the walls of recess 48, said recess being preferably located at the center of the upper face of slider plate 23. In the embodiment shown the terminus 39 has a cross-sectional area complementary to that of recess 48 in which it is located, imparting a positive driving connection for rotational and radial movement of slider plate 23 via handle 13. It is noted that the various Figures showing the positioning of the slider plate and plungers are taken parallel to the axes of recess 48. As shown in the drawings, the chamfering of the terminus 39 is provided so that uniform camming action is accomplished between terminus 39 and slider plate 23 without gouging recess 48 when spherical ball 25 is pivoted. The upper and lower ball guides 27, 24 are preferably circular with substantially flat upper surfaces 100, 102 and substantially flat lower surfaces 99, 101, respectively. The upper and lower ball guides 27, 24 may be joined together as by screws 60 inserted in said upper ball guide which engage threaded recesses 63 in said lower ball guide 24. Lugs 51, note FIG. 4, depending from the upper ball guide fit into corresponding recesses 52 in the lower ball guide for aligning the said guides. The upper face 102 of the lower ball guide 24 has an annular recess 54 coaxial with opening 104 into which an "O" ring (not shown) may be inserted to provide a seal against the passage of water. An additional recess 57 may be provided on the periphery of lower ball guide 24 for insertion of an "O" ring (not shown) to restrict the passage of fluids between the inner wall 110 of the valve cartridge 20 and the periphery 108 of said lower ball guide 24.

Referring now to FIGS. 3 through 7, the base 37 of valve cartridge 20 has a pair of arcuate channels 66 which direct the discharge from the hot water and cold inlet ports 11 and 12 into the water inlet passages 71 and 72, respectively, located in the valve cartridge 20. The upper ballguide 27 has a neck portion 61 extending above the top of the ball 25 and said neck having cross-sectional opening 62, substantially similar to but slightly larger than the cross-sectional area of the upper ball stem 28. This opening is elongated so that said stem 28 will not contact the front portion 91 or rear portion 92 of the neck 61 until the slider plate 23 has completed its full length of travel as hereinafter described. The front 91 and rear surfaces 92 of the neck 61, thus, serve to limit longitudinal movement of the valve handle 13 during operation. The front surface 91 of neck 61 and the upper ball stem 28 preferably are "V" shaped so that when the valve is closed the valve handle 13 is always returned to the neutral position.

Similarly, the lateral surfaces 93, 94 restrict rotational movement of the valve handle 13 and the upper ball stem 28 to a predetermined arc. As hereinafter described, this rotation of the valve handle 13 will permit temperature regulation of the water by rotation of the slider plate 23. Thus, neck 61 serves to limit the longitudinal and rotational movement of the slider plate 23 as well as to center the handle in the closed position.

Located on the periphery 107 of the upper ball guide are a pair of diametrically opposed lugs 44 which fit into corresponding recesses 45 in the top of the valve cartridge 20. This lug and recess arrangement serves the dual purpose of preventing any rotation of the upper ball guide 27 and also facilitates proper positioning of the valve assembly since the components of the valve assembly, the slider plate 23, lower ball stem 38, lower ball guide 24, ball 25, upper ball stem 28, and upper ball guide 27, may be presassembled before being inserted into the valve cartridge 20.

The slider plate 23 with which the lower ball stem terminus 39 communicates has two separate, substantially parallel cams 31, 32 as shown in FIG. 5. A portion of each cam 31, 32 contacting plungers 21, 22 is substantially flat 111, 112 while the remaining surfaces 113, 114 are of variable depth as shown in FIG. 4. The height of the plungers 21, 22, the taper of the slider plate cam sections 113, 114 and the height of water inlet passages 71, 72 through the valve cartridge 20 are interrelated. When the flat surfaces 111, 112 of the slider plate cams 31, 32 contact the plungers this contact must be sufficient to force the seating faces 121, 122 of plungers 21, 22 into the complementary tapered seats 81, 82 of the water inlet passages 71, 72 in the valve cartridge 20, thereby closing the inlets. When the slider plate 23 is moved so that variable depth cam surfaces 113, 114 of the slider plate are above each plunger, the plungers 21, 22 will be forced upward by the water pressure.

The exemplary embodiment of the subject valve operates substantially as follows:

When the valve handle 13 is in the position indicated by the solid lines in FIG. 2 the slider plate 23 is in its rearward most position in relation to neck 61.

When the slider plate is in this position, the flat, non-tapered surfaces 111 and 112 of the slider plate cams 31 and 32 are in contact with the plungers 21 and 22 and thus force the plungers to be fully seated against the tapered seats 81, 82 of the hot water and cold water passages 11, 12 thereby preventing any flow of fluid through the valve. The relative positions of the plungers 21 and 22 and the slider plate 23 during the no flow condition are shown in FIGS. 8 and 11.

When the valve handle 13 is raised from the position indicated by the solid line to the position shown by the broken line in FIG. 2, this motion is transmitted to the upper ball stem 28 and from there to the ball 25. The ball pivots in the chamber formed by the hemispherical recesses 67, 68 in guides 27, 24, respectively, thereby transmitting this motion to the lower ball stem 38. The terminus of the lower ball stem 39 is positioned in the slider plate 23 to move plate 23 and its slider plate cams 31 and 32 forward in relation to neck 61. As the slider plate 23 moves longitudinally, the plungers 21 and 22, which had been seated against the tapered seats 81 and 82 in the hot water and cold water inlet passages 71 and 72 in valve cartridge 20, are forced to move upwardly by the water pressure until the said plungers contact the tapered cam surfaces 113 and 114 in slider plate 23. When the valve handle 13 has been fully raised, the deepest portion of cam surfaces 113 and 114 is exposed to the plungers 21 and 22, thereby permitting the maximum permissable elevation of said plungers 21 and 22 in the hot and cold water inlet passages 71 and 72. FIGS. 9 and 12 show the positions of the slider plate 23 and plungers 21, 22 when the valve handle 13 has been raised for full flow. The arrows in FIG. 9 indicate the flow paths of the water exiting the valve with the valve fully open. The water passes upward through the lower sections of the hot water and cold water inlet passages 71, 72 in the valve housing 20 and thence through the fluted upper extremities 41, 42. This water then flows across an internal planar section 83 of the valve cartridge 20 and then downward and outward through the water discharge passage 40 which directs the water to lower point 84 on the valve housing recess 65 on the periphery of the valve cartridge. The hot and cold water mix during their flow through the water discharge passage 40 and through the flow channel formed by the valve housing recess 65 and the inner surface 90 of the valve cover plate 15. After flowing through this path, the water passes thence through the spout 18 and is discharged.

As the valve handle 13 is rotated counterclockwise toward lateral surface 93 on neck 61 while fully raised, the upper ball stem 28, ball 25, and lower ball stem 38, also rotate counterclockwise. The terminus of the lower ball stem 39 similarly rotates counterclockwise thereby rotating the slider plate 23. When the valve handle has been rotated until upper ball stem 28 contacts lateral surface 94 of neck 61, the cold water plunger 22 is exposed to the deepest section of the cam surface 114 in the slider plate cam 32 and the hot water plunger 21 is exposed to the flat, non-tapered surface 111 of the hot water slider plate cam 31 thereby forcing the hot water plunger 21 to become fully seated against the upward and outwardly tapered section 81 of the hot water passage 70. This results in only cold water passing through the valve. The position of the slider plate 23 and plungers 21, 22 permitting full-flow of only cold water and no flow of hot water through the valve is shown in FIGS. 10 and 13.

The valve operates in a substantially similar but opposite manner when hot water is required from the valve. As the handle is rotated clockwise towards lateral surface 94 on neck 61 from the previous position, the rotation of the handle is transmitted as hereinbefore described, to the slider plate 23 which also rotates clockwise permitting the hot water plunger 21 to rise slightly by exposing it to a tapered surface cam 113 in cam 31. Concurrently, cold water plunger 22 is forced in a downwardly direction toward the tapered section 82 in the cold water passage 72 by contacting the plunger with a progressively shallower cam surface 114 in cam 32. When the handle passes the neutral position equidistant between lateral surfaces 93 and 94 on neck 61, each plunger 21, 22 will contact the same cam depth on substantially similar cam surfaces 113 and 114 of cams 31 and 32 in slider plate 23. As the valve handle 13 is further rotated clockwise the cold water plunger 22 is further depressed by variable depth cam surface 114 of slider plate cam 32 while the hot water plunger 21 is permitted to rise further, thereby elevating the temperature of the water delivered. When the upper ball stem 28 contacts the lateral surface 94 on the neck portion 61 of upper ball guide 27 the cold water plunger 22 is forced by the cam surface 112 of cam 32 to completely seat against the upwardly and outwardly tapered section 82 in the cold water passage 72 while the hot water plunger 21 is contacted by cam surface 113 of slider plate cam 31, thus permitting flow of only hot water.

If the valve handle 13 is fully raised during or after rotation to the clockwise stop position, at lateral surface 44 of neck 61, the deepest recess in cam surface 113 of the slider plate cam 31 would be located above the hot water plunger 21 permitting the maximum rise of said plunger thereby resulting in maximum flow of hot water. If the handle had been only partially raised, a shallower depth of the slider plate cam 31 would have contacted the hot water plunger 21 thereby preventing the hot water plunger 21 from rising completely. This results in a lower rate of hot water flow from the valve. Regardless of the degree to which the valve handle 13 is raised, when the valve handle 13 is rotated such that upper ball stem 28 contacts lateral surface 93 on neck 61, the flat, non-tapered surface 112 of slider plate cam 32 contacts the cold water plunger 22, thereby keeping the cold water plunger 22 fully seated against the tapered seat 82 in the cold water inlet passage 72.

The invention is not to be limited to, or by details of, construction of the particular embodiment thereof as illustrated by the drawings, as various other forms of the device will, of course, be apparent to those skilled in the art without departing from the spirit of the invention or the scope of the claims. It is, for example, within the contemplation of the parties that this mixing valve could be equipped with a spray handle by the insertion of a diverter valve in the mixing valve assembly.

I claim:

1. A mixing valve of the type having a single handle for controlling the volume and relative proportion of hot and cold water flowing through the valve including:
   a. a housing adapted to receive a valve cartridge, said housing having a hot water inlet port a cold water inlet port and an outlet;
   b. a valve cartridge positioned in said housing, said cartridge having a plurality of water inlet passages in communication with said inlet water ports, and, a seat in each water inlet passage;
   c. a plunger positioned in each of said water inlet passages, said plunger adapted to be seated within its respective water inlet passage and to be freely slidable therein whereby inlet water displaces said plunger from its respective seat;
   d. a slider plate mounted above said plungers for sliding movement both radially and rotatably in a single plane with respect to the longitudinal axis of said valve cartridge, said plate having a plurality of cams adapted to restrict the movement of said plungers relative to said water inlet passage seats;
   e. means for sliding said plate to thereby position each of said plungers relative to its respective seat to thereby selectively control the volume of water through its passage to the outlet.

2. The valve of claim 1 wherein the housing comprises an inlet port holder, a valve cover plate and a retaining top.

3. The valve of claim 2 wherein the cams of said slider plate are of variable depth.

4. The valve of claim 3 wherein each water inlet passage comprises a first section and a second section, said first section located above said second section, said first section having a cross sectional area greater than the cross sectional area of said second section and wherein each of said seats comprises an upward and outward transition section between said first section and said second section.

5. The valve of claim 4 wherein each cam of said slider plate comprises a substantially flat surface and a variable depth surface.

6. A valve of claim 5 wherein the means for slidably moving rotating and reciprocating said plate comprises:
   a. an upper ball guide;
   b. a lower ball guide;
   c. a spheroidal means journaled between said guides;
   d. an upper ball stem extending from said spheroidal means, and a lower ball stem extending from said spheroidal means, said lower ball stem engaged with said slider plate to impart movement thereto when a handle attached to said upper ball stem is actuated.

7. A mixing valve of the type having a single handle for controlling the volume and relative proportions of hot and cold water flowing through said valve including hot water and cold water inlet ports communicating with said valve and having a means for discharging said water comprising:
   a. a valve cartridge positioned in a housing, said cartridge having a plurality of water inlet passages, each of said passages having an inlet section and outlet section, the inlet section communicating with a water inlet port and the outlet section having a seat adapted to seat a plunger;
   b. a plunger freely positioned in each outlet section, said plunger adapted for seating in said water outlet section and adapted to being displaced relative to said seat by the flow of water passing through said water inlet passages;
   c. a slider plate mounted above said plungers for sliding movement both radially and rotatably in a single plane with respect to the longitudinal axis of said valve cartridge, said plate having a plurality of cams adapted to restrict the movement of said plungers relative to said water inlet passage seats;
   d. means for slidably moving said slider plate whereby radial movement of said slider plate restricts the total displacement of said plungers relative to their respective seats and rotation restricts the relative displacement of each plunger, thereby selectively controlling the amount and temperature of the outlet water.

8. The valve of claim 7 wherein said slider plate comprises an upper face and a lower face and wherein said cam surface comprises a substantially flat section and a variable depth section on said lower face.

9. The valve of claim 8 wherein the said means for radially and rotatably moving said slider plate comprises a pivotal means engaged with said slider plate.

10. The valve of claim 9 wherein said pivotal means comprises a substantially spheroidal object which is engaged with the upper face of said slider plate.

11. The valve of claim 10 wherein each water inlet passage comprises a first section and a second section, said first section located above said second section, said first section having a cross-sectional area larger than the cross-sectional area of said second section.

12. The valve of claim 11 wherein each of said seats comprises an upward and outward tapered transition section between said first section and second section.

13. The valve of claim 12 wherein said first section and said second section of said water inlet passages are substantially cylindrical.

14. The valve of claim 13 having a pair of water inlet passages.

15. The valve of claim 14 wherein the slider plate comprises a pair of substantially similar cam sections, each cam section having a substantially flat surface and a variable depth surface.

16. The valve of claim 15 having a recess in the valve cartridge above said water inlet passages wherein said slider plate and said pivotal means are located.

* * * * *